Patented May 25, 1948

2,442,280

UNITED STATES PATENT OFFICE 2,442,280

MANUFACTURE OF ALDOLS

Louis Alhéritière, Melle, France, assignor to Les Usines De Melle (Societe Anonyme), Saint-Leger-les-Melle, France, a company of France No Drawing. Application May 1, 1945, Serial No. 591,397. In France April 17, 1944

Section 1, Public Law 690, August 8, 1946
Patent expires April 17, 1964

6 Claims. (Cl. 260—602)

When acetaldehyde is condensed in the presence of a condensation agent, particularly an alkali such as sodium hydroxide, the reaction is strongly exothermic and has a tendency to be accelerated, so that it is sometimes impossible to control it. Consequently, one generally works in an aqueous medium, as dilution by water results in moderating the reaction.

I have found in this respect that it is advantageous to use alcohols as diluents. As a matter of fact, I have found that alcohols exert a decidedly delaying action on production of polyaldols so that it is possible without lowering yield, to work at a higher temperature, in actual practice, from about 20 to about 40° C.; among other advantages, this enables of easily cooling the reactant mixture. Thus, for example, from solutions containing 80 per cent of aldehydes, I was led to the following results:

| Percentage of ethanal converted into aldol | Temperature | Percentage of heavy products, as reckoned upon aldol | |
|---|---|---|---|
| | | Alcoholic medium | Aqueous medium |
| Per cent | ° C. | Per cent | Per cent |
| 47 | 25–26 | 3–3.5 | 3–3.5 |
| 47 | 39–40 | 3.9 | 8–10 |
| 56 | 39–40 | 4.5 | 10–12 |

The aldolising reaction itself is substantially restrained so that risks of reaction being unduly accelerated are lessened, even when excess caustic soda accidentally happens to be introduced into the medium.

When the aldolising reaction has proceeded to the desired extent, alkali is neutralised by means of an acid, and the mixture is distilled with a view to separating excess original aldehyde. In working in accordance with my invention, acetaldehyde can be separated at a lower temperature than when water is used as a diluent, so that risks of crotonaldehyde production are substantially lowered. Thus for instance a 50 per cent mixture of aldol has a boiling point of 85° C. in the presence of ethyl alcohol, and 71° C. in the presence of methanol while the same mixture boils at 105° C. in the presence of water. Hence alcohol plays the part of a boiling point depressing agent as disclosed in copending application Serial No. 592,719, filed May 8, 1945, by H. M. Guinot and the present applicant; in other words owing to its volatility, alcohol causes the aldolic mixture to boil at a lower temperature and thus avoids any detrimental elevation of temperature.

Anyhow from the base of the distillation column, there is obtained an alcoholic solution of aldol which is practically free from acetaldehyde and may advantageously be used as such, without any previous separation, for certain uses, particularly with a view to hydrogenating aldol into butylene-glycol.

In this respect, I indeed have found that hydrogenation catalysts behave far better when treating aldol in alcoholic solution. Thus, for instance, with aldol in aqueous solution, a catalyst constituted by reduced nickel on kieselguhr loses its activity after performance of 5 or 6 hydrogenations while with aldol in alcoholic solution, its activity remains unaltered after 50 successive hydrogenations.

By using alcohols as diluents instead of water, I have aimed at the following objects:
1. Reducing the amount of polyaldols produced.
2. Lowering the risk of the reaction being unduly accelerated.
3. More easily separating unconverted acetaldehyde, without production of crotonaldehyde.
4. In the case of manufacture of butylene-glycol, securing a longer life for hydrogenation catalysts.

The minimum proportion of alcohol with respect to the aldehyde used as a starting material (in so far as alcohol should play the part of a boiling point depressing agent in distilling unconverted aldehyde, besides its playing the part of a diluent) is about 20 per cent by weight, there is no limit theoretically to the maximum that may be employed; in actual practice, of course, the proportion should not be too large, as high proportions of alcohol would need bulky apparatus.

Moreover, I have found that for separating aldol from acetaldehyde in the best conditions, i. e., with as little conversion of aldol into crotonaldehyde as possible, it is necessary to work with a pH value of 4 to 5. When a strong mineral acid such as sulphuric acid is used for acidification, it is indispensable in order to secure the required pH value, to employ accurately calculated amounts of said acid as the slightest difference above or below the right figure, would build a too acid or too alkaline pH range, likely to cause production of undesirable products from aldol.

I have further found, and this is another feature of my invention, that it is advantageous to use a lower aliphatic acid, particularly acetic acid, for acidifying the reactant mixture. Together with sodium acetate which is formed in the mixture, acetic acid constitutes a much valuable buffer around pH 4.5, so that by adding a large excess of acetic acid, a favourable pH value is automatically attained.

The following examples which have no limitative character will better show how this invention may be carried out.

1. I started from a mixture of 200 kg. of acetaldehyde with 50 kg. of absolute alcohol. Condensation was effected at 20-25° C. by adding 12 litres of alcoholic caustic soda containing 40 g. of NaOH per litre, i. e., 480 g. of NaOH. After 2 hours, the specific gravity of the reactant mixture was 0.970 at 20° C. and the percentage of converted acetaldehyde 48 per cent. Caustic soda was neutralized with 700 g. of acetic acid and the mixture was distilled for separating excess aldehyde. I obtained as a residue 93 kg. of aldol admixed with 50 kg. of alcohol; the yield thus amounted to 97 per cent.

Although the foregoing example relates to acetaldol, my invention is likewise applicable to the manufacture of other aldols, particularly propionaldol and butyraldol.

2. 200 kg. of freshly distilled butyraldehyde were mixed with 70 kg. of absolute alcohol, and condensation was performed at a temperature of about 25-30° C. by adding 10 litres of an alcoholic solution of sodium hydroxide containing 40 g. of NaOH per litre. After 1½ hours, the percentage of converted butyraldehyde amounted to 45 per cent. The mixture was neutralized with 600 g. of acetic acid and distilled as set forth in Example 1 to separate excess butyraldehyde. I thus obtained 87 kg. of butyraldol, the yield being about 97 per cent.

Alcohols other than methanol and ethyl alcohol may be used for diluting purpose, provided the boiling point of the alcohol selected is sufficiently low to enable it of playing the part of a boiling point depressing agent during distillation of excess aldehyde. Thus, for instance, for production of acetaldol, methanol, ethyl alcohol or isopropanol can be used while a higher alcohol would not be suitable. The alcohols in use should be anhydrous or at least very concentrated.

Generally speaking, my invention is applicable for carrying out in an improved manner, any known aldolisation methods, whether continuous or not. Again, the whole or part of the process may be carried out at superatmospheric or subatmospheric pressure. Finally, my invention is applicable particularly with the method described in the aforesaid co-pending application.

According to said method, aldolization is performed continuously in the presence of a condensation agent in a reaction zone containing aldehyde and the corresponding aldol, the aldol content being less than the critical content corresponding to incipient formation of poly-aldols at the reaction temperature; said temperature is kept by cooling, at a value close to but below the boiling point of the mixture, to which fresh aldehyde is supplied continuously; further condensation takes place in a cooled zone, e. g., in a cooled worm, wherethrough liquid withdrawn from the first reaction zone is passed continuously and supplied with further condensation agent.

While I have described what I deem to be an efficient and reliable embodiment of my invention, I do not wish to be limited thereto as many alterations may be made therein without departing from the spirit of the appended claims.

What I claim is:

1. A method for manufacturing an aliphatic aldol which comprises condensing an aliphatic aldehyde in a substantially anhydrous medium comprising an alcohol and an alkaline condensing agent, said medium providing at all times during the reaction an amount of alcohol equal to at least 20 per cent by weight of the said aldehyde.

2. A process as claimed in claim 1 wherein the condensation reaction is stopped prior to the stage where an undesirably large quantity of poly-aldol would be formed, adjusting the pH value of the thus reacted mixture to from 4 to 5, and thereafter separating unconverted aldehyde from said mixture.

3. A method for manufacturing an aliphatic aldol which comprises condensing an aliphatic aldehyde in a substantially anhydrous medium comprising an alcohol and an alkaline condensing agent within the temperature range of about 20° C. to about 40° C., said medium providing at all times during the reaction an amount of alcohol equal to at least 20 per cent by weight of the said aldehyde.

4. A process as claimed in claim 3 wherein the condensation reaction is stopped prior to the stage where an undesirably large quantity of poly-aldol would be formed, adjusting the pH value of the thus reacted mixture to from 4 to 5, and thereafter separating unconverted aldehyde from said mixture by distillation.

5. The process claimed in claim 4 wherein the aldehyde condensed is acetaldehyde.

6. The process claimed in claim 4 wherein the aldehyde condensed is butyraldehyde.

LOUIS ALHÉRITIÈRE.

REFERENCES CITED

The following references are of record in the file of this patent:

UNITED STATES PATENTS

| Number | Name | Date |
|---|---|---|
| 1,151,113 | Matheson | Aug. 24, 1915 |
| 1,450,984 | Matheson | Apr. 10, 1923 |
| 1,881,853 | Mueller-Cunradi | Oct. 11, 1932 |
| 2,318,341 | Thompson | May 4, 1943 |
| 2,376,070 | Metzger | May 15, 1945 |